United States Patent [19]

Tanaka et al.

[11] Patent Number: 4,675,040
[45] Date of Patent: Jun. 23, 1987

[54] METHOD FOR PRODUCING GLASS PREFORM FOR SINGLE MODE OPTICAL FIBER

[75] Inventors: Gotaro Tanaka; Futoshi Mizutani; Naoki Yoshioka; Hiroo Kanamori, all of Yokohama, Japan

[73] Assignee: Sumitomo Electric Industries, Ltd., Osaka, Japan

[21] Appl. No.: 722,384

[22] Filed: Apr. 12, 1985

[30] Foreign Application Priority Data

Apr. 20, 1984 [JP] Japan ................................ 59-78668

[51] Int. Cl.$^4$ .................. C03B 37/014; C03B 37/018
[52] U.S. Cl. .................................... 65/3.12; 65/18.2; 65/DIG. 16
[58] Field of Search .............. 65/13, 3.12, 3.11, 18.2, 65/DIG. 16

[56] References Cited

U.S. PATENT DOCUMENTS 4,125,388 11/1978 Powers ................................. 65/18.2
4,235,615 11/1980 Rau et al. ............................... 65/13

FOREIGN PATENT DOCUMENTS 55-67533  5/1980 Japan ........................... 65/DIG. 16
58-208146 12/1983 Japan ........................... 65/DIG. 16

OTHER PUBLICATIONS

Suda et al; Electronics Letters, 10/9/1980, vol. 16, No. 21; pp. 802–803.

Primary Examiner—Kenneth M. Schor
Attorney, Agent, or Firm—Cushman, Darby & Cushman

[57] ABSTRACT

A method for producing a glass preform for a single mode optical fiber comprising a core and a cladding, which method comprises depositing fine glass particle of a glass raw material on a periphery of a cylindrical seed member having a smooth and clean outer surface by flame hydrolysis to form a soot of the fine glass material, pulling out the seed member from the soot, inserting a core glass rod in a hollow portion of the soot and dehydrating and sintering a complex of a core rod and a cladding to produce a glass preform from which a single mode optical fiber having low attenuation of light transmission, particularly due to absorption by hydroxyl groups can be drawn.

7 Claims, 2 Drawing Figures

METHOD FOR PRODUCING GLASS PREFORM FOR SINGLE MODE OPTICAL FIBER

FIELD OF THE INVENTION

The present invention relates to a method for producing a glass preform for a single mode optical fiber. More particularly, it relates to a method for producing a glass preform for use in the fabrication of a single mode optical fiber with diminished attenuation of light transmission comprising a core made of pure silica and a cladding made of a silica optionally containing an additive.

BACKGROUND OF THE INVENTION

There are known several methods for producing an optical fiber including one comprising depositing fine glass particles on a periphery of a glass rod as a core by flame hydrolysis of a glass raw material to form a soot, melting the soot to produce a glass preform comprising a core and a cladding and then drawing the glass preform to fabricate an optical fiber.

A method previously proposed by the inventors comprises depositing fine glass particles on a periphery of a pure silica rod as a core by flame hydrolysis and dehydrating and sintering the soot in an atmosphere including a gaseous fluorine-containing compound to add fluorine to the silica glass to produce a glass preform comprising a core and cladding.

The conventional methods, however, have a drawback such that the optical fiber fabricated from the glass preform suffers from influence of light absorption by hydroxyl groups even if all of the core material, its surface layer and the cladding material are thoroughly dehydrated. Thus, it is difficult to produce a single mode optical fiber having low attenuation of light transmission in a wavelength range near a wavelength of 1.3 micrometers, which is close to a wavelength of 1.39 micrometers at which the large absorption peak by the hydrogen groups appear. This may be due to the fact that, in the initial stage of depositing the fine glass particles on the core rod by the flame hydrolysis, the core material is heated by the oxyhydrogen flame and the hydroxyl groups diffuse from the core surface into the core inside.

SUMMARY OF THE INVENTION

One object of the invention is to provide a glass preform from which a single mode optical fiber comprising a core and a cladding and having greatly diminished attenuation of light transmission due to the hydroxyl groups is fabricated.

Another object of the invention is to provide a process for producing a glass preform from which a single mode optical fiber comprising a core and a cladding and having greatly diminished attenuation of light transmission due to the hydroxyl groups is fabricated.

Accordingly, the present invention provides a method for producing a glass preform for a single mode optical fiber comprising a core and a cladding, which method comprises depositing fine glass particle of a glass raw material on a periphery of a cylindrical seed member, for example, a rod or a tube having a smooth and clean outer surface by flame hydrolysis to form a soot of the fine glass material, pulling out the seed member from the soot, inserting a core glass rod in a hollow portion of the soot and dehydrating and sintering a complex of a core rod and a cladding, optionally with selectively adding an additive to the cladding, to produce a glass preform.

DETAILED DESCRIPTION OF THE INVENTION

As described above, the method of the present invention comprises forming a soot of fine glass particles in the form of a tube, inserting a core glass rod in the hollow portion of the soot tube to form a complex of the core and the cladding and dehydrating and sintering the complex in a suitable atmosphere to melt it to produce a glass preform. In the sintering step, an additive is optionally added selectively to the cladding. From the glass preform produced by the method of the invention, a single mode optical fiber is fabricated by a per se conventional method.

Since the core glass rod is inserted after the formation of the soot tube, i.e. the cladding in the method of the invention, the diffusion of the hydroxyl groups into the core is prevented, which is encountered in the step for depositing the cladding on the core in the conventional methods. The hydroxyl groups adhered to or contained in the soot tube are completely removed in the dehydrating and sintering step.

Figure 1:
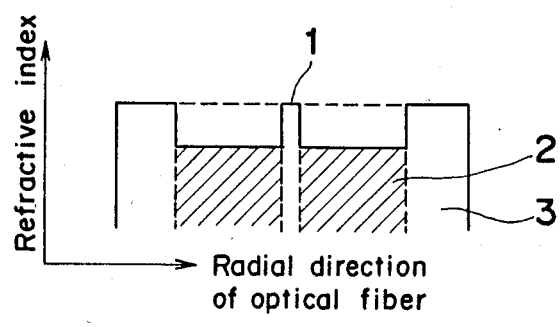
FIG. 1 shows a distribution of refractive index of the optical fiber fabricated from the glass preform which is produced in Example according to the present invention.

One of the conventional methods comprises forming a soot which comprises a core and a cladding by depositing fine glass particles on a seed rod and sintering and melting the soot to obtain a glass preform. However, by this method, any additive cannot be selectively added to the cladding in the sintering step. On the contrary, by the present method, an additive can be selectively added to the cladding so as to produce the glass preform from which a single optical fiber comprising a core 1 made of pure $SiO_2$, a cladding 2 made of fluorine-containing $SiO_2$ and a jacket 3 made of pure quartz and having a distribution of the refractive index as shown in FIG. 1 and suffering no influence of absorption by the hydroxy groups is fabricated.

As the seed member, a rod or a tube of quartz glass, carbon, a metal such as aluminum is used. The outer periphery of the seed member is smoothed and cleaned in a suitable manner for the material of the member. For example, in case of a glass member, its surface is mechanically ground and flame polished with an oxyhydrogen flame or the like. In case of a carbon or metal member, it is ground with a lathe and abrased with a fine abrasive paper or abrasive.

The core glass rod is preferably a pure silica rod and preferably polished and drawn to a predetermined outer diameter with a plasma flame since it reduces an amount of residual water.

On the periphery of the seed member, the fine glass particles are deposited by flame hydrolyzing the glass raw material to form the soot. Flame hydrolysis may be carried out under substantially the same conditions as in the conventional method. Specific examples of the glass raw material are $SiCl_4$, $GeCl_4$, etc. Outer diameter of the thus produced soot is preferably from 100 to 200 mm.

Then, the seed member is pulled out to form the tube-like soot. In the hollow portion of the soot, the core glass rod is inserted to form the complex of the core and the soot, namely the cladding, and the complex is dehydrated and sintered in a suitable atmosphere to form the glass preform comprising the core and the cladding. The sintering is carried out in the same manner as in the conventional method. For example, the complex is sintered in an atmosphere of an inert gas (e.g. helium) at a temperature of from 1,300 to 1,700, preferably from 1,400 to 1,700. To add the additive to the cladding, the atmosphere contains the additive. The additive may be any of conventionally used ones (e.g. $SF_6$, $CF_4$, $CCl_2F_2$, $SiF_4$, $BF_3$, $BCl_3$, etc.). Preferred conditions are shown in Example described below.

The glass preform is drawn by a per se conventional method to fabricate an optical fiber comprising the core and the cladding.

The glass preform may be provided with a jacket tube and melt to produce a core/cladding/jacket complex, which is drawn to produce an optical fiber comprising the core, the cladding and the jacket.

The present invention will be explained in detail by following Examples.

EXAMPLE

A quartz glass rod of 8 mm in outer diameter was flame polished to smooth its surface and used as a seed member.

$SiCl_4$ was introduced in and hydrolized by an oxyhydrogen flame jetted on the surface of the seed member, which rotated around its axis and travelled horizontally, and the formed fine glass particles of $SiO_2$ were deposited on the periphery of the seed member to form a soot of 180 mm in outer diameter. Then, the seed member was pulled out to form the tube-like soot.

Separately, a pure silica rod of 8 mm in diameter was flame polished by the plasma flame and inserted in the hollow portion of the soot to produce a complex of the pure silica rod and the tube-like soot.

The thus produced complex was dehydrated and added with fluorine in a stream of a mixture of helium at 5,000 ml/min., chlorine at 50 ml/min. and $SF_6$ at 200 ml/min. at 1,300° C. at a lowering speed of 3 mm/min. Then, the complex was sintered in a helium stream at 10,000 ml/min. at 1,650° C. at a lowering speed of 4 mm/min. to made it transparent.

Figure 2:
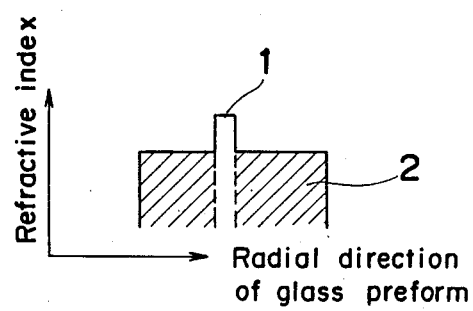
FIG. 2 shows a distribution of refractive index of the glass preform produced in Example according to the present invention.

The thus produced transparent glass preform had a distribution of the refractive index as shown in FIG. 2, in which the difference between the refractive indexes of the core and the cladding is 0.30 and the ratio of the diameter cf the cladding and that of the core is 8.0.

Around the glass preform, as a jacket, a quartz tube was covered and the core/cladding/jacket complex was drawn at 2,100° C. to fabricate an optical fiber of 125 micrometers in outer diameter, 56 micrometers in cladding diameter and 7 micrometers in core diameter having a distribution of the refractive index as shown in FIG. 1.

The attenuation of light transmission of the thus produced optical fiber was about 1 dB/km at a wavelength of 1.3 micrometer, which means that the optical fiber is an excellent single mode optical fiber.

Comparative Example

As the seed material, the same pure silica rod as used in Example was used. Around the seed material, the fine glass particle was deposited in the same manner as in Example. The thus formed complex was dehydrated and added with fluorine in the same manner as in Example to produce a glass preform, from which an optical fiber was fabricated in the same manner as in Example. The attenuation of the light transmission due to absorption by the hydroxyl groups at a wavelength of 1.39 micrometer was more than 50 dB/km and that at the wavelength of 1.3 micrometer was more than 2 dB/km due to the influence of the absorption peak at 1.39 micrometer.

What is claimed is:

1. A method for producing a glass preform for a single mode optical fiber with diminished attenuation of light transmission including a core and a cladding, said method comprising the following steps:

depositing fine glass particles on the peripheral surface of a cylindrical seed member having a smooth and clean outer surface by flame hydrolysis, to form a self supporting soot of said fine glass particles;

pulling out said seed member from said soot, to form a bore within said soot;

inserting a core glass rod in said bore of said soot which soot forms a cladding; and dehydrating and sintering a complex of said core glass rod and said soot cladding to fuse them together to produce a glass preform.

2. A method according to claim 1, wherein the complex of the core and the cladding is sintered in an atmosphere comprising an additive to add it to the cladding.

3. A method according to claim 2, wherein the additive is a fluorine-containing compound and fluorine is added to the cladding.

4. A method according to claim 1, wherein the seed member is a rod or a tube formed from a material selected from the group consisting of quartz glass, carbon and aluminum.

5. A method according to claim 1, wherein the core glass rod is formed of pure silica glass.

6. A method for producing a glass preform for a single mode optical fiber with diminished attenuation of light transmission including a core and a cladding, said method comprising the following steps:

depositing fine glass particles on the peripheral surface of a cylindrical seed member having a smooth and clean outer surface by flame hydrolysis, to form a self supporting soot of said fine glass particles;

pulling out said seed member from said soot cladding, to form a bore within said soot;

inserting a core glass rod in said bore of said soot which soot forms a cladding and which inserting results in a core-cladding complex;

providing a glass jacket around said core-cladding complex; and dehydrating and sintering a complex of said core glass rod, said soot cladding, and said glass jacket to fuse them together to produce a core-cladding-jacket glass preform.

7. A method according to claim 6, wherein the jacket is a quartz tube.

* * * * *